United States Patent
Goldstein et al.

(10) Patent No.: US 8,060,614 B2
(45) Date of Patent: Nov. 15, 2011

(54) STREAMING OPERATOR PLACEMENT FOR DISTRIBUTED STREAM PROCESSING

(75) Inventors: Jonathan D. Goldstein, Kirkland, WA (US); Roger S. Barga, Bellevue, WA (US); Mirek Riedewald, Ithaca, NY (US); Mingsheng Hong, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 12/141,914

(22) Filed: Jun. 19, 2008

(65) Prior Publication Data

US 2009/0319687 A1 Dec. 24, 2009

(51) Int. Cl.
G06F 15/16 (2006.01)
(52) U.S. Cl. .................. 709/226; 718/105; 709/231
(58) Field of Classification Search .............. 709/231, 709/226; 718/105
See application file for complete search history.

(56) References Cited

U.S. PATENT DOCUMENTS

| | | | |
|---|---|---|---|
| 5,671,403 A | 9/1997 | Shekita et al. | |
| 6,032,144 A | 2/2000 | Srivastava et al. | |
| 6,691,101 B2 | 2/2004 | MacNicol et al. | |
| 7,010,538 B1 | 3/2006 | Black | |
| 7,200,117 B2 * | 4/2007 | Chiu et al. | 370/238 |
| 7,272,707 B2 | 9/2007 | Liu et al. | |
| 7,277,950 B1 * | 10/2007 | Chapweske | 709/231 |
| 7,496,683 B2 * | 2/2009 | Lang et al. | 709/241 |
| 7,831,718 B2 * | 11/2010 | Chapweske | 709/238 |
| 2004/0220923 A1 | 11/2004 | Nica | |
| 2005/0021511 A1 | 1/2005 | Zarom | |
| 2006/0085558 A1 * | 4/2006 | Solomon | 709/238 |
| 2006/0129528 A1 | 6/2006 | Miyamoto et al. | |
| 2008/0028095 A1 * | 1/2008 | Lang et al. | 709/232 |
| 2008/0304516 A1 * | 12/2008 | Feng et al. | 370/468 |
| 2009/0300183 A1 * | 12/2009 | Feng et al. | 709/226 |
| 2009/0319687 A1 * | 12/2009 | Goldstein et al. | 709/241 |
| 2010/0036779 A1 * | 2/2010 | Sadeh-Koniecpol et al. | 709/238 |

OTHER PUBLICATIONS

Yang Guo, Zihui Ge, Bhuvan Urgaonkar, Prashant Shenoy, Don Towsley, Dynamic cache reconfiguration strategies for cluster-based streaming proxy, Computer Communications, vol. 29, Issue 10, Monitoring and Measurements of IP Networks, Jun. 19, 2006, pp. 1710-1721, ISSN 0140-3664, DOI: 10.1016/j.comcom.2005.09.017.*

U. Srivastava, K. Munagala, and J. Widom. Operator placement for in-network stream query processing. In PODS, 2005.*

(Continued)

*Primary Examiner* — Ajay Bhatia
(74) *Attorney, Agent, or Firm* — Lyon & Harr, L.L.P.; Craig S. Fischer

(57) ABSTRACT

A streaming operator assignment system and method for determining a streaming operator assignment that minimizes overload in a data processing system. Embodiments of the streaming operator assignment system include an optimization goals definition module, which defines optimization goals in terms of fundamental quantities that system administrators and application writers want to control, such as minimizing the worst case latency over all periods of time, or minimizing how much the system is backlogged with work. Embodiments of the streaming operator assignment system also include an optimization goals solution module that optimizes and solves a selected optimization goal. A specialized optimization technique is used to find the best operator (or load) assignment using the optimization goals to measure of the value of the assignment. This technique minimizes an optimization goal by iterating over all possible operators assignments over all possible nodes to find the operator assignment that minimizes the desired optimization goal.

20 Claims, 6 Drawing Sheets

OTHER PUBLICATIONS

Badrish Chandramouli, Jonathan Goldstein, Roger Barga, Mirek Reidewald, and Ivo Santos. Accurate Latency Estimation in a Distributed Event Processing System. In Proceedings of the 27th International Conference on Data Engineering (ICDE '11), Hannover, Germany, Apr. 2011 (to appear).*

Peter Pietzuch, Jonathan Ledlie, Jeffrey Shneidman, Mema Roussopoulos, Matt Welsh, and Margo Seltzer. 2006. Network-Aware Operator Placement for Stream-Processing Systems. In Proceedings of the 22nd International Conference on Data Engineering (ICDE 2006). IEEE Computer Society, Washington, DC, USA.*

Avnur, et al., "Eddies: Continuously Adaptive Query Processing", ACM SIGMOD Record, vol. 29, Issue 10, Jun. 2000, p. 261-272.

Babu, et al., "Continuous Queries over Data Streams", ACM SIGMOD Record, vol. 30, Issue 3, Sep. 2001, pp. 109-120.

Chen, et al., "NiagaraCQ: A Scalable Continuous Query System for Internet Databases", In SIGMOD, 2000, 12 pages.

Dalvi, et al., "Pipelining in MultiQuery: Optimization", Proceedings of the twentieth ACM SIGMOD-SIGACT-SIGART symposium on Principles of database systems, 2001, pp. 59-70.

Abadi, et al., "The Design of the Borealis Stream Processing Engine", Second Biennial Conference on Innovative Data Systems Research, 2005, 13 Pages.

Abdelnaser Adas, "Traffic Models in Broadband Networks", Communications Magazine, IEEE, vol. 35, Issue 7, Jul. 1997, pp. 82-89.

Ahmad, et al., "Network-Aware Query Processing for Stream-based Applications", Proceedings of the 30th VLDB Conference, 2004, pp. 456-467.

Babcock, et al., "Models and Issues in Data Stream Systems", Technical Report. Stanford InfoLab, 21st ACM Symposium on Principles of Database Systems, 2002, pp. 1-30.

Carney, et al., "Monitoring Streams—A New Class of Data Management Applications", Proceedings of the 28th international conference on Very Large Data Bases, 2002, pp. 215-226.

Chandrasekaran, et al., "TelegraphCQ: Continuous Dataflow Processing for an Uncertain World", Proceedings of the 2003 ACM SIGMOD international conference on Management of data, 2003, 12 pages.

Chekuri, et al., "On Multi-dimensional Packing Problems", SIAM Journal on Computing, vol. 33, Issue 4, 2004, 22 pages.

Cranor, et al., "Gigascope: A Stream Database for Network Applications", Proceedings of the 2003 ACM SIGMOD international conference on Management of data, Jun. 9-12, 2003, pp. 647-651.

Demers, et al., "Towards Expressive Publish/Subcribe Systems", 2006, pp. 1-18.

Garofalakis, et al., "Resource Scheduling for Composite Multimedia Objects", Proceedings of the 24rd International Conference on Very Large Data Bases, 1998, pp. 74-85.

Gross, et al., "Fundamentals of Queueing Theory", Third Edition, Feb. 1998, 1 pages.

"The Internet Traffic Archive", http://ita.ee.lbl.gov/.

Kifer, et al., "Detecting Change in Data Streams", Proceedings of the Thirtieth international conference on Very large data bases—vol. 30, 2004, pp. 180-191.

"The State of the Art in Distributed Query Processing", http://www.accessmylibrary.com/coms2/summary_0286-28755794_ITM.

Pietzuch, et al., "Network-aware operator placement for stream processing systems", Proceedings of the 22nd International Conference on Data Engineering, 2006, 12 pages.

Shah, et al., "An Adaptive Partitioning Operator for Continuous Query Systems", Proceedings of the 19th International Conference on Data Engineering (ICDE'03), IEEE, 2003, pp. 25-36.

Willinger, et al., "Self-Similarity Through High-Variability", IEEE/ACM Transactions on Networking, vol. 5, No. 1, Feb. 1997, pp. 71-86.

Wu, et al., "High Performance Complex Event Processing Over Streams", Proceedings of the 2006 ACM SIGMOD international conference on Management of data, Jun. 27-29, 2006, pp. 407-418.

Xing, et al., "Providing Resiliency to Load Variations in Distributed Stream Processing", Proceedings of the 32nd international conference on Very large data bases, Sep. 12-15, 2006, pp. 775-786.

Xing, et al., "Dynamic Load Distribution in the Borealis Stream Processor", Proceedings of 21st International Conference on Data Engineering, ICDE 2005, Apr. 5-8, 2005, pp. 791-802.

Garofalakis, et al., "Multi-dimensional resource scheduling for parallel queries", In Proceedings of the 1996 ACM SIGMOD International Conference on Management of Data, Jun. 1996, pp. 365-376.

* cited by examiner

STREAMING OPERATOR PLACEMENT FOR DISTRIBUTED STREAM PROCESSING

BACKGROUND

Processing of a data stream can be quite a resource intensive procedure. A data stream is a sequence of an order list of values (called a "tuple"). Many established and emerging applications can be naturally modeled as data stream applications. In order to monitor a data stream, a user registers continuous queries with the Data Stream Management System (DSMS). These queries continuously update their state and produce new output for newly arriving stream tuples. In a typical data stream application users expect at least quasi-real time results from their continuous queries, even if the stream has a high rate of arrival. Due to these requirements, data stream processing can be very resource intensive.

Examples of a data stream are monitoring of networks and computing systems, consumer credit card purchases, telephone calls dialed by callers, monitoring of sensor networks, and supply chain management and inventory tracking based on RFID tags. Another example of a data stream is measurement data, such as IP traffic at router interfaces, sensor networks, and road traffic measuring. Even publish-subscribe and filtering and dissemination of RSS feeds (such as for monitoring the "blogosphere") can be viewed as data stream applications.

One way in which this resource intensive problem has been addressed is to distribute the processing load over multiple nodes in a network. A fundamental challenge, however, of such a distributed stream processing system is to select the correct criterion for distributing load in the system. Load balancing in traditional distributed and parallel systems is a well-studied problem. These techniques do not carry over to data stream processing, because load balancing decisions on a per-tuple basis are too costly. In load balancing techniques, incoming jobs (queries) have to be assigned to processing nodes such that throughput is maximized or latency (response time) is minimized. This is usually achieved by some type of load balancing, which takes into account the availability of input data at the processing nodes and communication costs for moving data between nodes.

In a data stream processing system, the roles of queries and data are reversed from traditional distributed systems. Namely, queries are continuously active while new data tuples are streaming in at a high rate. This creates new challenges for a data stream processing system compared to traditional distributed systems. In a data stream processing system the individual input tuples are small. It is therefore too costly to decide for each tuple individually to which processing node it should be routed. Furthermore, for operators with state (such as sliding window joins), re-routing tuples would also require migrating operator state to the new processing nodes.

In order to amortize the optimization cost, tuple routing decisions should be made such that they benefit many stream tuples. This is achieved by assigning operators to processing nodes. These are operators that take real-time data from things like network monitoring sensors, stock market, etc., and perform some form of processing on the data (such as rank the data, correlating the data, or filter the data). The data is not stored somewhere and then processed, but instead the data is processed in real time as it arrives to the operator. In other words, each operator inputs a stream of events, processes the stream of events, and outputs a processed stream of events.

Given a set of these streaming operators that are running on a data processing system, and given that there is a collection of computing devices or processors connected together, the goal is to determine how to best assign these streaming operators to those processors. This is called operator placement. The operator placement, and hence the routing pattern for the tuples, are used for a large number of input tuples and are only changed when system statistics change significantly. This can be called a Distributed Operator Placement (DOP) problem.

Several techniques have been proposed for placing operators in a distributed streaming system for the purpose of balancing load and improving query latency. These techniques are based on some type of operator placement strategy. One obvious solution to the DOP problem is to assign operators to nodes such that system load is balanced for a "typical" case. Optimizing for the "typical" load is not sufficient. This is because data streams in practice tend to be "bursty", meaning that data is received in large waves at one time and a trickle of data the next moment. This bursty nature makes it virtually impossible to react to short-duration load bursts with any kind of load re-balancing. While the system is busy adapting to a burst, the load situation might already have changed significantly again to require another adaptation.

To address this problem, some techniques use resilient operator placements, where the system can handle a wide variety of load situations without any node being over-loaded. A related idea for distributed stream processing is to prevent load spikes by placing operators with uncorrelated load behavior onto the same node and to maximize load correlations between different nodes. Other techniques for distributing load for data stream processing include distributing the load of a single operator. Queuing theory has provided valuable insights into scheduling decisions in multi-operator and multi-resource queuing systems, but results are usually limited by high computational cost and strong assumptions about underlying data and processing cost distributions.

The problem with all of these operator placement strategies is that they are heuristics that have been found to achieve good overall results. In other words, these approaches take some heuristic that researchers believe result in some good placement of the streaming operators without any type of mathematical structure, and then apply that placement that provides good results. The point is that these existing techniques do not provide a solid mathematical foundation or a solid optimization foundation to the DOP problem. While an assignment of streaming operators to processors is made, left unanswered are questions about the quality of the assignment and even how to measure the quality of the assignment in a principled, precise way. Thus, these placement strategies are based on trial and error and these heuristic solutions are not designed to directly optimize a specific, application oriented optimization goal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the streaming operator assignment system and method find the most effective assignment for streaming operators in a data processing system. This system is on a network having many nodes, and the streaming operators input data, process the data, and then output the data. By finding the most effective (or best) assignment of streaming operators to network nodes, the efficiency of the processing of data in the system can be greatly increased. Embodiments of the streaming operator assignment system define the optimization goals in terms of fundamental quantities that system administrators and application writers want to control, such as minimizing the worst case latency over all periods of time, or minimizing how much the system is backlogged with work. Embodiments of the streaming operator assignment system then define a series of optimization problems in terms of the optimization goals and how the data processing system should behave during periods of overload.

Embodiments of the streaming operator assignment system include an optimization goals definition module and an optimization goals solution module. The optimization goals are goal that system administrators and application writers feel are important to measure the efficiency of the data processing system. Embodiments of the optimization goals definition module formally models and defines performance goals for throughput and latency of the data processing system. Embodiments of the optimization goals definition module define four optimization goals. The first two optimization goals formalize throughput goals (namely, maximum instantaneous overload and average instantaneous overload), while the other two optimization goals formalize latency goals (namely, maximum accumulated overload and average accumulated overload). For all optimization goals, performance of the data processing system is determined by the node having the worst performance (which is known as the bottleneck node). This bottleneck-focused approach provides the strongest guarantees for system performance.

The maximum instantaneous overload optimization goal seeks to minimize the worst instantaneous overload on the system. Moment by moment, by looking at the worst state that has occurred in the system across all time based on a system history, this optimization goal seeks to know how overloaded would the system have been during that worst case overload. This optimization goal is to reduce that overload at that instant as much as possible over all time and over all nodes. The average instantaneous overload optimization goal seeks to ensure that at any instant in time the system does not have any node that is continuously unstressed. This is based on a history of the system and load sequences over time intervals.

The history of the system can be any desired time interval of the system. This history is used to define the optimization goal and to determine how well the system is performing according the optimization goal. For example, if it is desired to minimize the worst overload over all time, then a history of what happened, say, in the last week or year, is used. A particular operator placement is applied to that period having the worst overload of the system. It then can be determined if that particular streaming operator placement was used at that worst time within the given history, how well the system would have performed with this particular placement. This is known as the "goodness" of the placement.

The maximum accumulated overload optimization goal does not look at only a moment in time, but rather looks at an accumulation of the system being overloaded or underloaded for a particular period of time. For example, if the system is overloaded, overloaded, overloaded, and overloaded, that is worse than being overloaded, underloaded, underloaded, and overloaded. In other words, maximum accumulated overload optimization goal is a measure of how far behind is the system at its worst moment. The average accumulated overload optimization goal is an average of the worst accumulated overload over a time interval. The idea is to minimize the average accumulative overload over all possible operator assignments over the nodes.

Embodiments of the streaming operator assignment system include an optimization goals solution module. Embodiments of the optimization goals solution module optimize and solve the previously-defined optimization goals for the data processing system. Once the optimization goals are defined, a specialized optimization technique is used to find the best operator (or load) assignment using the optimization goals as a measure of the value of the assignment. This is called a streaming operator hill-climbing technique with random restarts. The general idea for this technique is to minimize an optimization goal by iterating over all possible operators assignments over all possible nodes to find the operator assignment that minimizes the desired optimization goal.

Embodiments of the streaming operator assignment system formally achieve dramatic improvements, both in result quality and especially in run-time performance. The result is a formal framework for expressing, analyzing, and implementing various distributed optimization goals. This framework can be extended as needs evolve.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the streaming operator assignment system and method reference is made to the accompanying drawings, which form a part thereof, and in which is shown by way of illustration a specific example whereby embodiments of the streaming operator assignment system and method may be practiced. It is to be understood that other embodiments may be utilized and structural changes may be made without departing from the scope of the claimed subject matter.

I. System Overview

Figure 1:
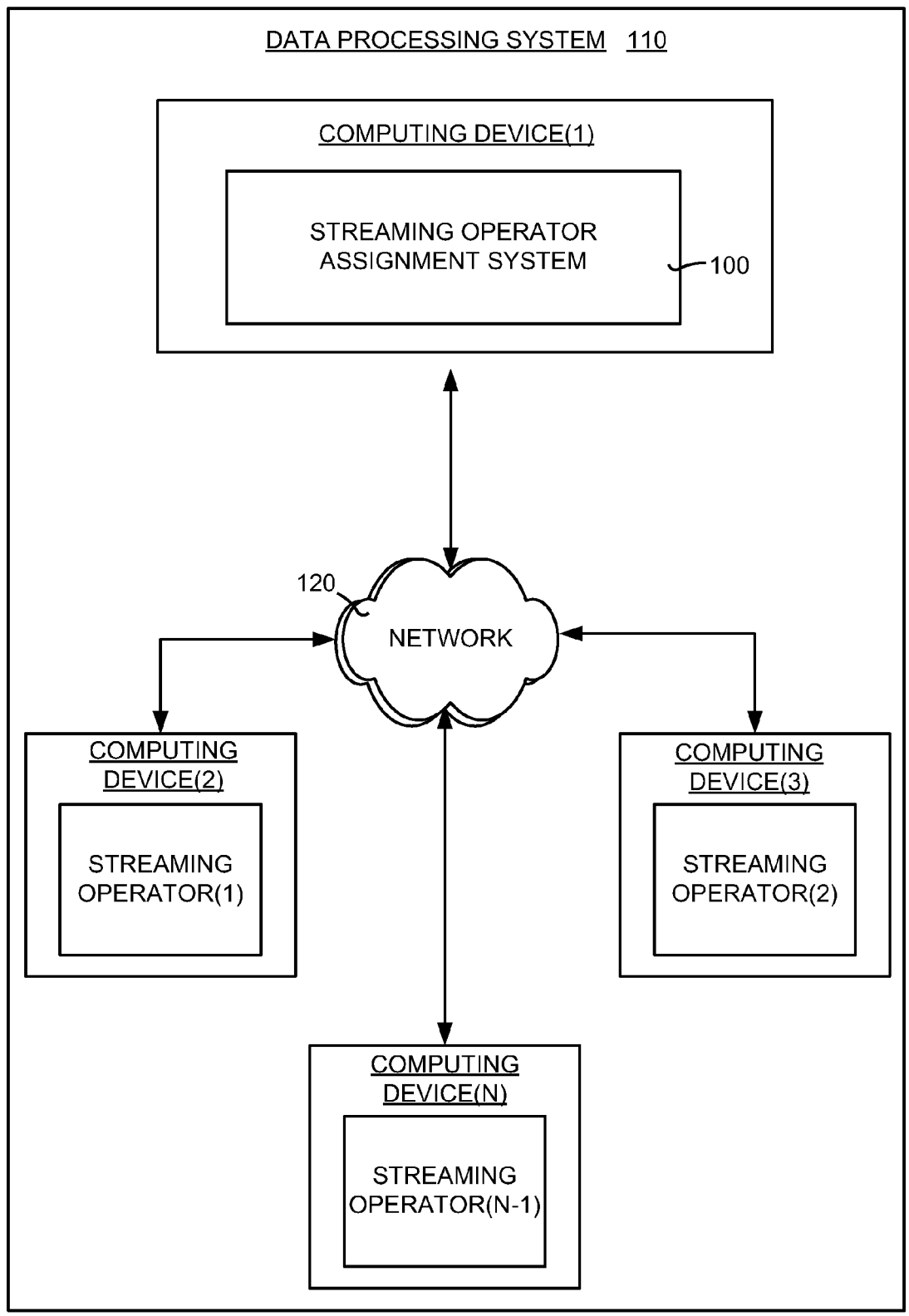
FIG. 1 is a block diagram illustrating a general overview of embodiments of the streaming operator assignment system and method disclosed herein.

FIG. 1 is a block diagram illustrating a general overview of embodiments of the streaming operator assignment system and method disclosed herein. It should be noted that the implementation shown in FIG. 1 is only one of many implementations that are possible. Referring to FIG. 1, a streaming operator assignment system 100 is shown implemented in a data processing system 110 having a network 120 and a plurality of computing devices. The computing devices are in communication with each other using the network 120. It should be noted that the computing devices may include a single processor (such as a desktop or laptop computer) or several processors and computers connected to each other.

The streaming operator assignment system 100 is implemented on a first computing device (1). A first streaming operator (1) is disposed on a second computing device (2). Similarly, a second streaming operation is disposed on a third computing device (3), and so forth. As shown in FIG. 1, there are N computing devices and N-1 streaming operators. However, it should be noted that there can be any number of computing devices and any number of streaming operators, and that FIG. 1 is merely an illustrative example.

The streaming operators shown in FIG. 1 are operators that take real-time data from input such as network monitoring sensors or the stock market, and perform some type of processing on the data. By way of example, this processing may include ranking the data, correlating the data, or filtering the data. The data is not stored somewhere and then processed, rather, the data is processed in real time by the streaming operators as the data arrives. Thus, each of streaming operators inputs a stream of events, processes the stream of events, and then outputs a processed stream of events. Given a set of these streaming operators that are running on the data processing system 110, and given that the data processing system 110 includes a collection of N computing devices in communication over the network 120, the challenge is to determine how to assign these streaming operators among the N computing devices.

Figure 2:
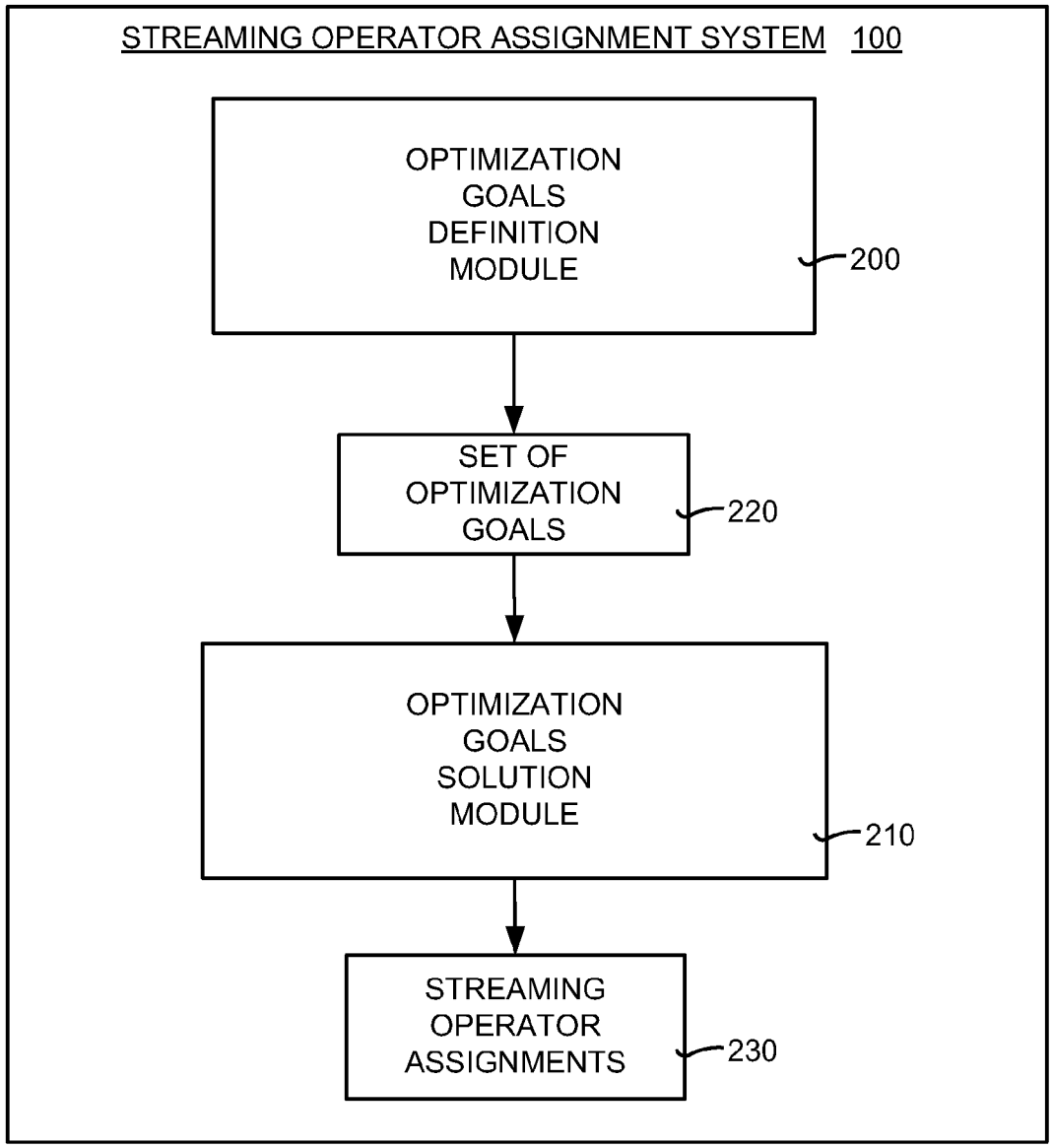
FIG. 2 is a block diagram illustrating the details of embodiments of the streaming operator assignment system shown in FIG. 1.

FIG. 2 is a block diagram illustrating the details of embodiments of the streaming operator assignment system 100 shown in FIG. 1. Embodiments of the streaming operator assignment system 100 includes an optimization goals definition module 200 and an optimization goals solution module 210. The optimization goals definition module 200 defines particular optimization goals that may be interesting for system administrators and application writers to want to use and solve. The optimization goals solution module 210 selects a previously-defined optimization goal and solves or optimizes that particular goal in the context of the data processing system 110.

Referring to FIG. 2, embodiments of the streaming operator assignment system 100 use the optimization goals definition module 200 to define certain optimization goals that may be useful. The output from the optimization goals definition module 200 is a set of optimization goals 220. One or more optimization goals from the set of optimization goals 220 is sent to the optimization goals solution module 210. The module 210 solves the optimization goal to find the optimal streaming operator assignment for the data processing system 110 based on the selected optimization goal. The output of the optimization goals solution module 210 is streaming operator assignments 230.

II. Operational Overview

In general, embodiments of the streaming operator assignment system 100 both defines optimization goals and then solves the previously-defined optimization goals in the context of the data processing system 110. The system 100 defines optimization goals in terms of fundamental quantities that system administrators and application writers would like to control, such as minimizing the worst case latency over all periods of time, or minimizing how much the system is backlogged with work. A specially adapted technique then is used to solve the optimization goal based on how the system 110 should behave in a worst case scenario.

Figure 3:
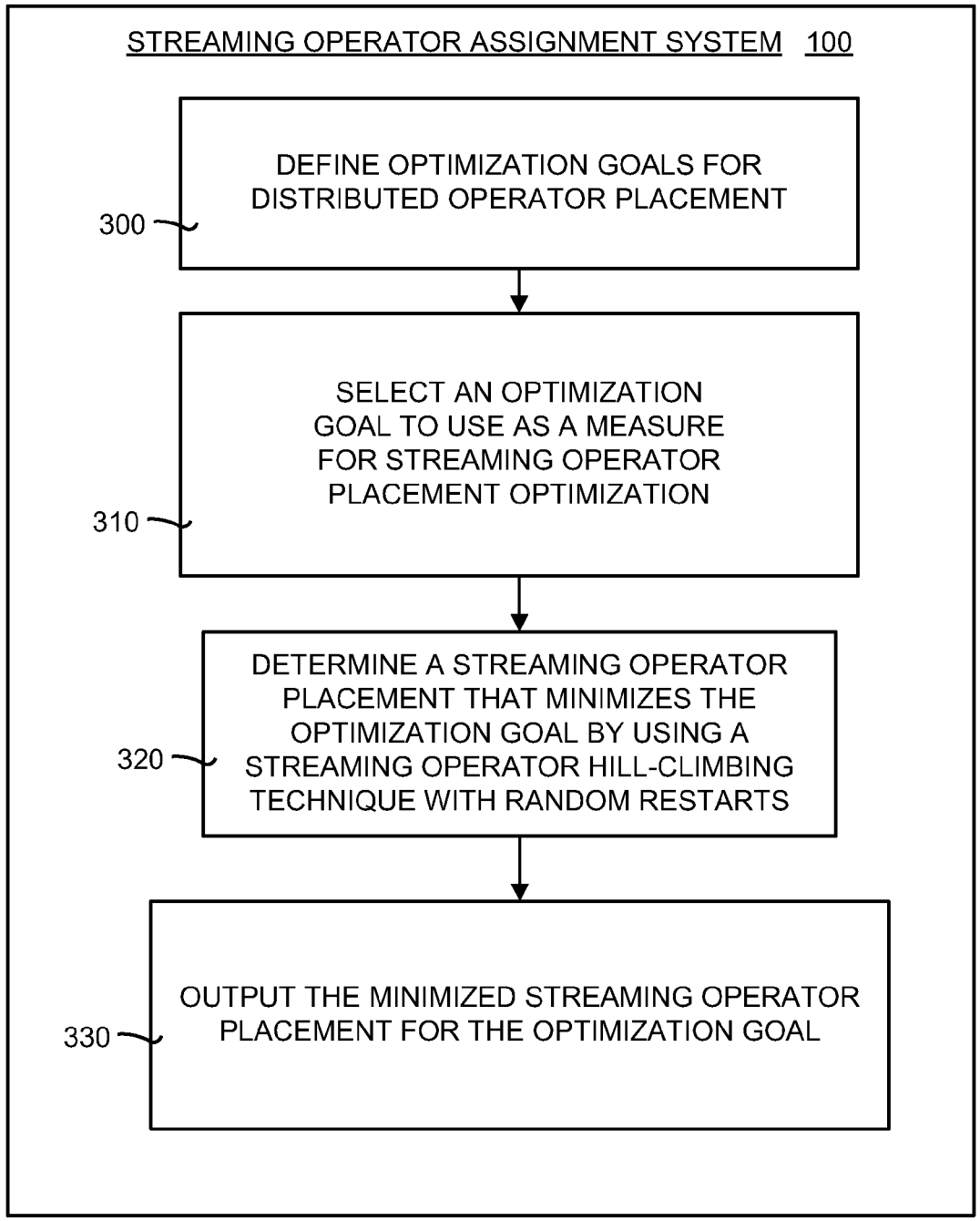
FIG. 3 is a detailed flow diagram illustrating the operation of embodiments of the streaming operator assignment system shown in FIGS. 1 and 2.

FIG. 3 is a detailed flow diagram illustrating the operation of embodiments of the streaming operator assignment system shown in FIGS. 1 and 2. In particular, referring to FIG. 3, the streaming operator assignment method begins by defining one or more optimization goals for the distributed operator placement (DOP) problem (box 300). The details of these optimization goals are discussed below. Next, an optimization goal is selected from the defined optimization goals (box 310). The selected optimization goal is used as a measure and benchmark for streaming operator placement.

Once an optimization goal is selected, a streaming operator placement is determined that minimizes the selected optimization goal (box 320). As explained in detail below, this is achieved using a streaming operator hill-climbing technique with random restarts. This technique is an alternative to iterating over all possible operator placements and over all possible nodes in the data processing system 110, in order to avoid the prohibitive cost of an exhaustive search. The result, therefore, may not necessarily be optimal, but achieves a high quality placement in a short period of time. Once the optimization goal has been solved or minimized, the minimized streaming operator placement for the selected optimization goal is output (box 330). This optimized streaming operator placement represents a high-quality operator placement, in terms of the specified optimization goals, for the data processing system 110. The data processing system then can be used to process incoming data.

III. Operational Details

The operational details of embodiments of the streaming operator assignment system 100 and method now will be discussed. These embodiments include two main modules. The operational details of each of these modules now will be discussed.

III.A. Optimization Goals Definition Module

Figure 4:
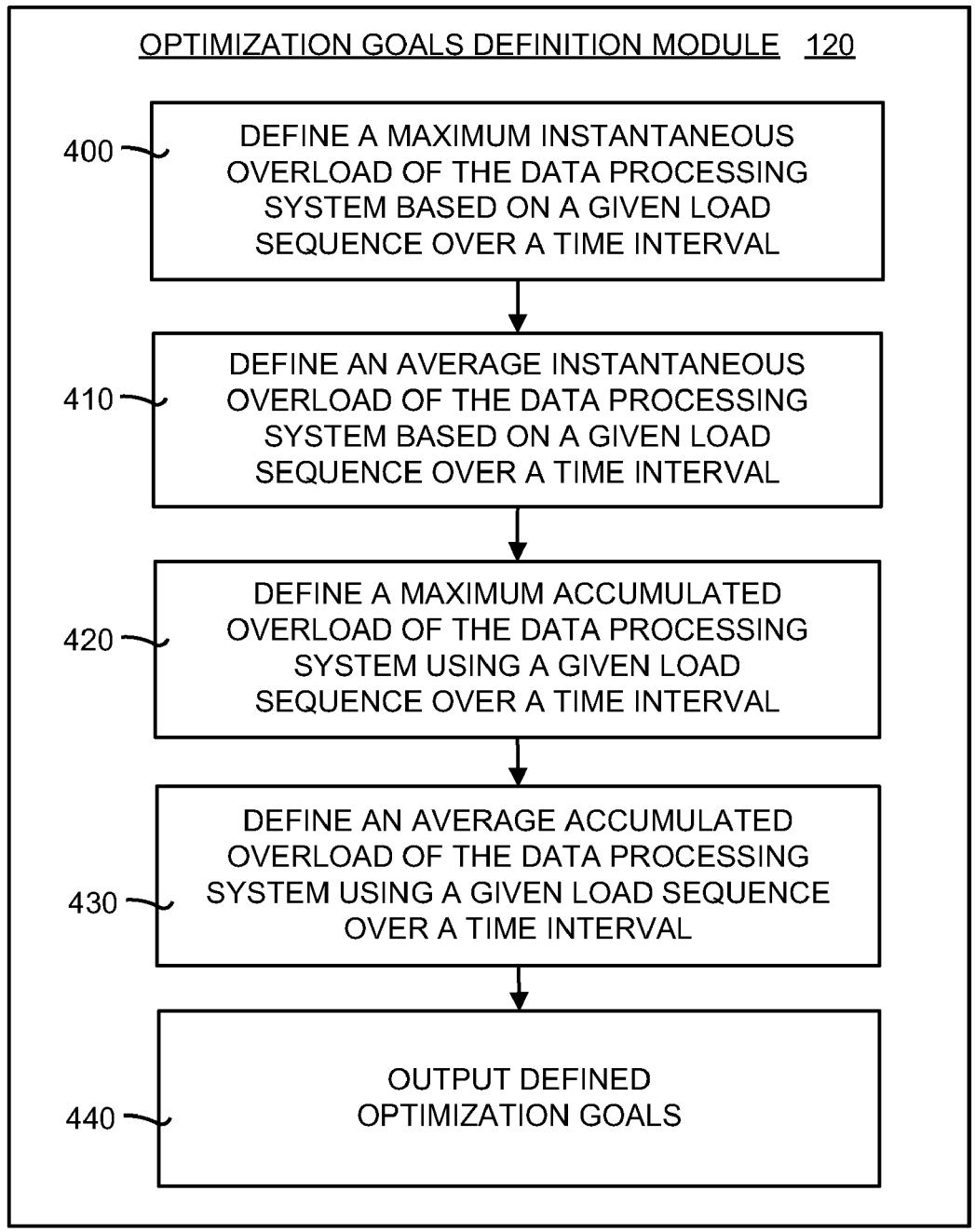
FIG. 4 is a detailed flow diagram illustrating the operation of embodiments of the optimization goals definition module shown in FIG. 2.

As noted above, embodiments of the streaming operator assignment system 100 includes an optimization goals definition module 200. FIG. 4 is a detailed flow diagram illustrating the operation of the optimization goals definition module 200 shown in FIG. 2. First, the module 200 defines a maximum instantaneous overload of the data processing system 110 based on a load sequence over a time interval (box 400). Next, the module 200 defines an average instantaneous overload of the system 110 also based on a load sequence over a time interval (box 410).

The module 200 also defines maximum accumulated overload of the system 110 by using a given load sequence over a particular time interval (box 420). In addition, an average accumulated overload of the data processing system 110 is defined using a given load sequence over a time interval (box 430). Finally, the module 200 outputs these defined optimization goals (box 440).

The optimization goals definition module 200 models and defines performance goals for throughput and latency of the data processing system 110. In particular, there are four optimization goals that the optimization goals definition module 200 defines. The first two optimization problems formalize throughput goals, while the other two optimization problems formalize latency goals. Each of these defined optimization goals now will be discussed in detail.

III.A.1 Maximum Instantaneous Overload

One of the optimization goals that formalize throughput goals is the maximum instantaneous overload. Ideally, operators can be assigned to nodes such that there is never an overloaded node in the data processing system. This guarantees that stream tuples will always be processed immediately on arrival and will not spend time waiting in queues of operators that "fell behind". In other words, system throughput is high enough to keep up with any occurring load combination.

This notion is captured by the concept of "instantaneous overload". Instantaneous overload measures by how much the load produced at each moment in time exceeds the available central processing unit (CPU) capacity of a node. Overload is considered relative to a node's CPU capacity to also handle heterogeneous clusters whose nodes have widely varying CPU capacities.

The formal definition of the maximum instantaneous overload is as follows. Maximum instantaneous overload for a time interval $[t_0; t_1]$ is the greatest relative difference between a load on a node and its CPU capacity, across all nodes and considering all load combinations that occur in that time interval. Mathematically, this can be written as:

$$\max_{N_i \in \mathcal{N}} \max_{L_t \in \mathcal{L}, t \in [t_0, t_1]} \frac{\text{Load}(N_i, L_t) - CPU_i}{CPU_i}.$$

Note that $CPU_i$ is the CPU capacity of node i, Load (Ni, Lt) calculates the total load on node i at time t given the operator load combination at time t. The load combination is a vector that expresses, for each operator, the operator's instantaneous load at a point in time.

By way of example, assume there is a node $N_i$ and there are two operators $O_1$ and $O_2$. The optimization goal is to minimize the maximum instantaneous overload. If a solution exists where the maximum instantaneous overload is non-positive, then it is guaranteed that every node in the data processing system at every moment during the time interval $[t_0; t_1]$ can process input tuples as fast as they arrive. If, for example, the maximum instantaneous overload is -0.1, then each node is guaranteed to be underutilized by at least 10% at all times.

III.A.2 Average Instantaneous Overload

A second optimization goal that formalizes throughput goals is the average instantaneous overload. It will not always be possible to guarantee that no node is ever overloaded. For many applications (such as a free service for filtering and dissemination of news), such performance guarantees are not even necessary. Instead, it is desirable to guarantee that the data processing system can keep up with the input streams "in the long run". Some processing nodes might temporarily fall behind during a load spike, but eventually they will catch up and process all their input tuples. In other words, the data processing system throughput is high enough to keep up with the expected load. This concept can be captured by the following notion of average instantaneous overload.

Mathematically, for a time interval $[t_0; t_1]$, the average instantaneous overload can be defined as:

$$\max_{N_i \in \mathcal{N}} \frac{E[\text{Load}(N_i)] - CPU_i}{CPU_i}.$$

By way of example, for a node $N_i$ and two operators $O_1$ and $O_2$. In the above definition, $E[\text{Load}(N_i)]$ is the expected load of the node $N_i$ for a given operator assignment and all load combinations occurring during time interval $[t_0, t_1]$, which can be written as, $$E[\text{Load}(N_i)] = \frac{1}{t_1 - t_0 + 1} \sum_{L_t \in \mathcal{L}, t \in [t_0, t_1]} \text{Load}(N_i, L_t).$$

The maximum over all nodes is taken to ensure that every node is able to keep up with its input streams. Thus, the average instantaneous overload is non-positive if and only if none of the nodes in the system are overloaded on expectation. A negative value indicates that every node in the system could handle that much more average load. The optimization goal is to minimize the average instantaneous overload.

III.A.3 Maximum Accumulated Overload and Average Accumulated Overload

The two optimization goals that formalize latency goals are the maximum accumulated overload and the average accumulated overload. If no DOP solution with a non-positive maximum instantaneous overload can be found, then average instantaneous overload is not the only alternative goal. The average instantaneous overload has the disadvantage of "averaging out" periods of poor system performance. For example, a node on average might only need 50% of its CPU resources to keep up with its input streams, but it can still have extended periods of overload. During these times tuples might accumulate in operator queues, causing significant delays. To minimize such delays, the optimization goals definition module 200 seeks to optimize the latency introduced by overloaded nodes.

Latency is difficult to model, because it depends on operator scheduling decisions, queue length, and per-tuple processing times of the individual operators. Therefore, the optimization goals definition module 200 uses accumulated overload as a proxy, which is highly correlated with latency. Accumulated overload of a node at some time instant t is the amount of work that this node "is behind" at that instant in time. By way of example, if a node with 2 billion cycles per second CPU capacity has 10 billion cycles worth of unprocessed tuples in operator queues, then it will need 5 seconds to process this "left-over" work from previous input tuples before it can start processing newly arriving tuples. It is possible for the node to prioritize newly arriving tuples, but that would not address the latency issue, because older tuples are delayed even longer.

The optimization goals definition module 200 first formally defines accumulated overload. In particular, consider a sequence of load combinations $(Lt_0, Lt_{0+1}, \ldots, Lt_1)$ that occur in a time interval $[t_0, t_1]$. Mathematically, accumulated overload of a node $N_i$ then is defined iteratively as follows:

$$AccLoad(N_i, t_0) = c_i$$

$$AccLoad(N_i, t) = \max\{0, AccLoad(N_i, t-1) + \text{Load}(N_i, L_t) - CPU_i\}, \text{ for } t_0 < t \leq t_1.$$

Here $c_i$ denotes the accumulated overload of node $N_i$ at time $t_0$. For simplicity and without loss of generality, in some embodiments the module 210 will set $c_i$=0.

The optimization goals definition module 200 also formalizes the notion of worst and average accumulated overload of any node in a given time interval. The optimization problem is to minimize accumulated overload to avoid queuing delays. Mathematically, for a given load sequence $(Lt_0, Lt_{0+1}, \ldots, Lt_1)$ in a time interval $[t_0, t_1]$, the maximum accumulated overload is defined as:

$$\max_{N_i \in \mathcal{N}} \max_{t \in [t_0, t_1]} \frac{AccLoad(N_i, t)}{CPU_i};$$

Moreover, the average accumulated overload is defined as:

$$\max_{N_i \in \mathcal{N}} \frac{1}{t_1 - t_0 + 1} \sum_{t=t_0}^{t_1} \frac{AccLoad(N_i, t)}{CPU_i}.$$

Intuitively, the maximum accumulated overload reflects the worst queuing delay due to unprocessed input tuples accumulating on a node, while the average accumulated overload measures the average queuing delay.

III.A.4 Alternate Embodiments of the Optimization Goals Definition Module

The defined optimization goals are directly dependent on actual performance requirements of the data processing system. Based on previously observed load combinations, stream rates, and operator properties, the optimization goals definition module 200 is able to predict future load combinations. Once this is achieved, then the module 210 can find a DOP solution that minimizes the selected overload metric.

As long as future load combinations are as predicted, no further re-optimization of embodiments of the streaming operator assignment system 100 is necessary. A re-optimization would be triggered by a significant change in predicted future load distributions, and such change could be detected using any of the existing algorithms for change detection in data streams. There is an obvious tradeoff between optimization cost and suboptimal load assignment, depending on how frequently re-optimization and reconfiguration are triggered.

The optimization goals definition module 200 also indirectly provides some notion of resiliency. The optimization goals take the entire joint load distribution for a given time interval into account and are determined by the bottleneck node in the data processing system 110. Overloaded nodes will negatively impact performance metrics, and thus embodiments of the streaming operator assignment system 100 will try to avoid overloaded nodes as much as possible. Performance in terms of throughput or latency characteristics (such as the worst case) is the primary goal, while resiliency is secondary and only strived for to the degree that it results in better throughput or latency properties.

The optimization goals definition module 200 also contains an alternative performance metric like system-wide average instantaneous overload optimization goal. Mathematically, this is expressed as:

$$\frac{1}{n} \sum_{N_i \in \mathcal{N}} \frac{E[Load(N_i)] - CPU_i}{CPU_i}.$$

This optimization goal is similar to average instantaneous overload, but it averages the average instantaneous overload across all nodes rather than taking the average instantaneous overload of the bottleneck node. For this metric a configuration like (−5,3), meaning that one node have an average instantaneous overload of −5 and another node has an average instantaneous overload of 3, is equivalent to a configuration (−1,−1), meaning that both nodes have an average instantaneous overload of −1. In practice the latter configuration is preferable, because none of the nodes is overloaded. Similar arguments apply to the other optimization goals that average across different nodes. Intuitively, optimizing based on bottleneck performance forces the most balanced load distribution.

III.B. Optimization Goals Solution Module

Embodiments of the streaming operator assignment system 100 also include an optimization goals solution module 210. Embodiments of the optimization goals solution module 210 optimize and solve the previously-defined optimization goals for the data processing system 110. Once the optimization goals are defined, a specialized optimization technique is used to find the best operator (or load) assignment using the optimization goals as a measure of the value of the assignment. The general idea for embodiments of the optimization goals solution module 210 is to minimize one or more of the optimization goals by iterating over all possible operators assignments over all possible nodes to find the operator assignment that minimizes the desired optimization goal.

III.B.1 Solving the Optimization Goals

The optimization goals solution module 210 uses a variation of a randomly seeded hill climbing technique with random restarts to optimize and solve a selected optimization goal. The traditional hill climbing technique is well-known to those of ordinary skill in the art. The variation of the hill-climbing technique with random restarts used by the optimization goals solution module 210 is called a streaming operator assignment hill-climbing technique with random restarts. For this technique, the way in which a step is taken to ensure that progress is made towards solving a defined and selected optimization goal is unique.

The individual steps taken are different for each optimization problem to which the hill climbing with random restarts technique is applied. For the optimization goals defined above, the optimization goals solution module 210 uses the streaming operator assignment hill-climbing technique with random restarts includes a unique process by which hill-climbing steps are taken. More specifically, the way in which a change to an existing operator assignment is selected so as to guarantee that the new operator assignment will be an improvement and be closer to the best solution over the previous assignment is unique.

The streaming operator assignment hill-climbing technique with random restarts ensures that, at any given moment, progress is being made towards the best answer. One reason the technique is called hill climbing is because you start with an operator (or load) assignment, and then according to the optimization goal it is decided how "good" is a particular operator assignment. The measure of how "good" is the particular operator assignment is based on and measured by the particular optimization goal itself.

The streaming operator assignment hill-climbing technique with random restarts computes the actual overload of the system at the worst moment to determine how well that particular operator assignment fared. Then, the operator assignment is changed by some small increment and in such a way to guarantee that the new operator assignment will always be "better" than the old operator assignment. This streaming operator assignment hill-climbing technique with random restarts guarantees that progress is being made and that the solution is getter closer to the best possible answer for that optimization goal.

Random restarts are used to ensure that a best solution is found. For example, sometimes when using a hill climbing technique a point is reached in the problem where the solution cannot be improved further. This may or may not be the best solution. It may only be a local optimum, which means that there are no current modifications that can be made to improve the solution. The way around this is to start in a totally different place in the problem. This will likely result in a different local optimum being reached. After this random restart, the hill climbing technique is used until another peak or local optimum is reached. Once this occurs, another random restart is performed along with the subsequent hill climbing to reach yet another peak or local optimum. This continues until it is believed that a good solution has been reached. For example, if ten peaks have been found and their solutions have been good then it can be assumed a solution has been found. This is not generally true for all hill climbing-based approaches, but it seems to be true for this particular problem.

Abstractly, the streaming operator assignment hill-climbing technique greedily transforms one streaming operator placement to another one, such that the value of the optimization goal improves. This streaming operator assignment hill-climbing technique keeps iterating until no further improvement is possible, or the optimization budget is exhausted. The streaming operator assignment hill-climbing technique is based on the fact that for proposed optimization problems system performance is determined by the bottleneck node (or the most overloaded node).

Figure 5:
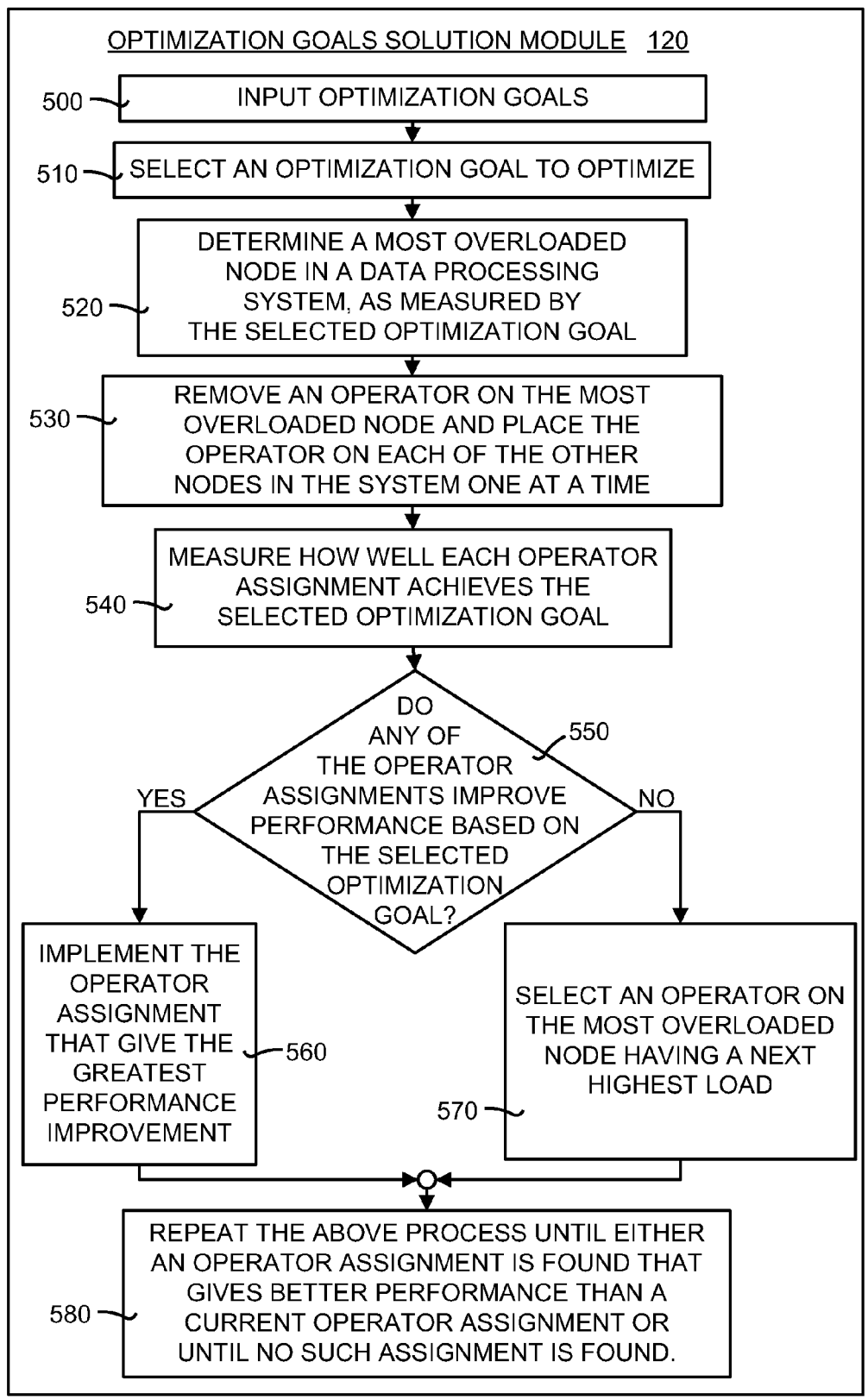
FIG. 5 is a detailed flow diagram illustrating the operation of embodiments of the optimization goals solution module shown in FIG. 2.

FIG. 5 is a detailed flow diagram illustrating the operation of embodiments of the optimization goals solution module 210 shown in FIG. 2. The module 210 begins by inputting the optimization goals defined by the optimization goals definition module 200 (box 500). Next, the optimization goals solution module 210 selects an optimization goal to optimize (box 510). A most overloaded node (or bottleneck node) in the data processing system 110 is determined using the selected optimization goal as a measure (box 520).

The module 210 then removes a streaming operator from the most overloaded node and places the operator on each of the other nodes in the data processing system 110 one at a time (box 530). The idea is that the streaming operator whose removal results in the greatest reduction in overload on the bottleneck node is used. This is done by measuring how well each operator assignment achieves the selected optimization goal (box 540).

This operator is assigned to the target node that among all nodes in the system would have the lowest overload score after this operator is added there. However, the operator move is only permitted if the overload score on the target node after adding the operator there is below the overload score of the bottleneck node before the move. In other words, a determination is made as to whether any of the streaming operator assignments improve performance based on the selected optimization goal (box 550). If an improved operator assignment is found, then that operator assignment is implemented that gives the greatest performance improvement of the data processing system 110 (box 560). Otherwise, then the module 210 selects the operator on the most overloaded node with the next highest load, and attempts to relocate that operator in the same manner as the previous operator (box 570). This continues until the optimization goal has improved, or all operators on the most overloaded node have been considered for migration without success. If no operator could be relocated successfully, hill climbing terminates (box 580). It should be noted that attempts to relocate operators on other nodes will not improve the optimization goal since the overload on the most overloaded node will be unchanged.

The streaming operator assignment hill-climbing technique for the various optimization goals are similar, except that a different optimization goal is used to determine the bottleneck node (or most overloaded node), and the node performance after removing or adding an operator. This greatly simplifies implementation of specialized algorithms for the different optimization problems. In other words, the same streaming operator assignment hill-climbing technique can be used except that a different optimization goal may be selected as the performance metric.

III.B.2 Runtime Complexity of Solving the Optimization Goals

The streaming operator assignment hill-climbing technique of the optimization goals solution module 210 has two phases: (1) generating a random operator placement; and, (2) performing several hill-climbing steps. Random placement relies on a standard pseudo-random number generator. For a homogeneous system where the m operators are distributed uniformly, random assignment can be done in $O(m)$. For heterogeneous systems where probabilities are weighted by node CPU capacity, random assignment cost is $O(m \log n)$, because a binary search needs to be performed to translate a random number into a node identification.

The overall complexity of the streaming operator assignment hill-climbing technique depends on the number of successful operator migration steps. First, the worst case cost of such a step is analyzed for the optimization goal maximum accumulated overload. It costs $O(m \cdot s)$ to find the bottleneck node, where $s=t_1-t_0+1$ is the length of the given sequence of load combinations. Let mi denote the number of operators assigned to node $N_i$, $1 \leq i \leq n$. Thus, $$\sum_{i=1}^{n} m_i = m.$$

Computing maximum accumulated overload for node $N_i$ costs $m_i \cdot s$. By keeping track of the maximum of the maximum accumulated overload while computing it for one node after the other, the bottleneck node can be found in time, $$\sum_{i=1}^{n} m_i \cdot s = m \cdot s.$$

Let $N_1$ be the bottleneck node. For each operator on $N_1$, the maximum accumulated overload of $N_1$ is computed, if that operator was removed from $N_1$. The cost of this step is $m_1 \cdot (m_1-1) \cdot s = O(m_2 s)$. Then the operators are sorted by their scores, at an additional cost of $O(m \log n)$. For an operator considered for removal from $N_1$, the maximum accumulated overload needs to be computed for all nodes $N_2, \ldots, N_n$ after this operator is received and then the target node with the lowest maximum accumulated overload value is determined. This step basically is identical to finding the bottleneck node and hence has a cost of $O(m \cdot s)$. In the worst case, the streaming operator assignment hill-climbing technique has to try all operators on $N_1$, leading to an overall cost of $O(m^2 s)$ for finding the target node.

Hence, the worst case cost of a streaming operator assignment hill-climbing step for the maximum accumulated overload is $O(m^2 s)$. If it is assumed that streaming operators typically are fairly evenly distributed over the nodes, then this cost reduces to:

$$O\left(\frac{m^2}{n} s\right).$$

The cost analysis for the average accumulated overload performance metric is identical. For the maximum instantaneous overload metric, the cost of computing the per-node performance can be reduced by maintaining Load($N_i$,L) for each node $N_i$ between consecutive hill-climbing steps. This reduces the cost for finding the bottleneck node and the target node for an operator from O(m·s) to O(n·s), resulting in overall complexity of O(m·n·s) for the hill-climbing step. Notice that for the maximum instantaneous overload, s denotes the number of different load combinations in the considered time interval [$t_0,t_1$]. For the average instantaneous overload performance metric, the load sequence size does not affect optimization cost, because only expected load is considered. This reduces the cost of a hill-climbing step to O(m·n).

The following should be noted about s, which is the number of load combinations in the considered time interval [$t_0,t_1$]. For a continuous time domain, the continuous load time series can be approximated by a step function that essentially is a histogram of the original continuous function. Furthermore, to reduce optimization time of the maximum instantaneous overload, the maximum accumulated overload, and the average accumulated overload, the given load sequence ($L_1, L_2, \ldots, L_s$) can be replaced by a summary with less elements, such as a histogram of the original function. This way approximation can be leveraged for significant optimization cost improvement.

III.B.3 Alternate Embodiments of the Optimization Goals Solution Module

In some embodiments of the streaming operator assignment system 100, the optimization goals solution module 210 can be modified to take network resources into account. The embodiments discussed above assume that the network is never the bottleneck, but that it is always the processor that is the bottleneck. Embodiments that take the network resource into account model the network as a resource the same as a processor is modeled as a resource. The network can get behind in delivering its results the same way that a processor can get behind processing its results. Network link capacity is one resource that limits throughput or introduces additional latency. The network link capacity can be treated like CPU resources and take into account how load accumulates at network links.

Network resources are included in the streaming operator assignment hill-climbing technique by modeling the effect on the network in addition to modeling the effect on the processors. Note, however, that the streaming operator assignment hill-climbing technique will become more complex, because moving operators from one node to another not only affects the CPU load, but also some network links. Specifically, when a node is removed from the processor the transport of the data that that operator receives over the network link is also removed. The loads on both the incoming and the outgoing network links associated with the operator being moved must be adjusted.

These embodiments of the streaming operator assignment hill-climbing technique assume that there is some sort of graph that describes how the nodes are connected. Using this graph, and the process above, when an operator is removed from one node and the operator is placed on another node, it can be determined which network link loads need to be adjusted. Similarly, when considering overload, if a network link, rather than a node, is the most overloaded, then the streaming operator assignment system 100 and method consider moving operators that consume capacity on that network link.

IV. Exemplary Operating Environment

Embodiments of the streaming operator assignment system 100 and method are designed to operate in a computing environment. The following discussion is intended to provide a brief, general description of a suitable computing environment in which the streaming operator assignment system 100 and method may be implemented.

Figure 6:
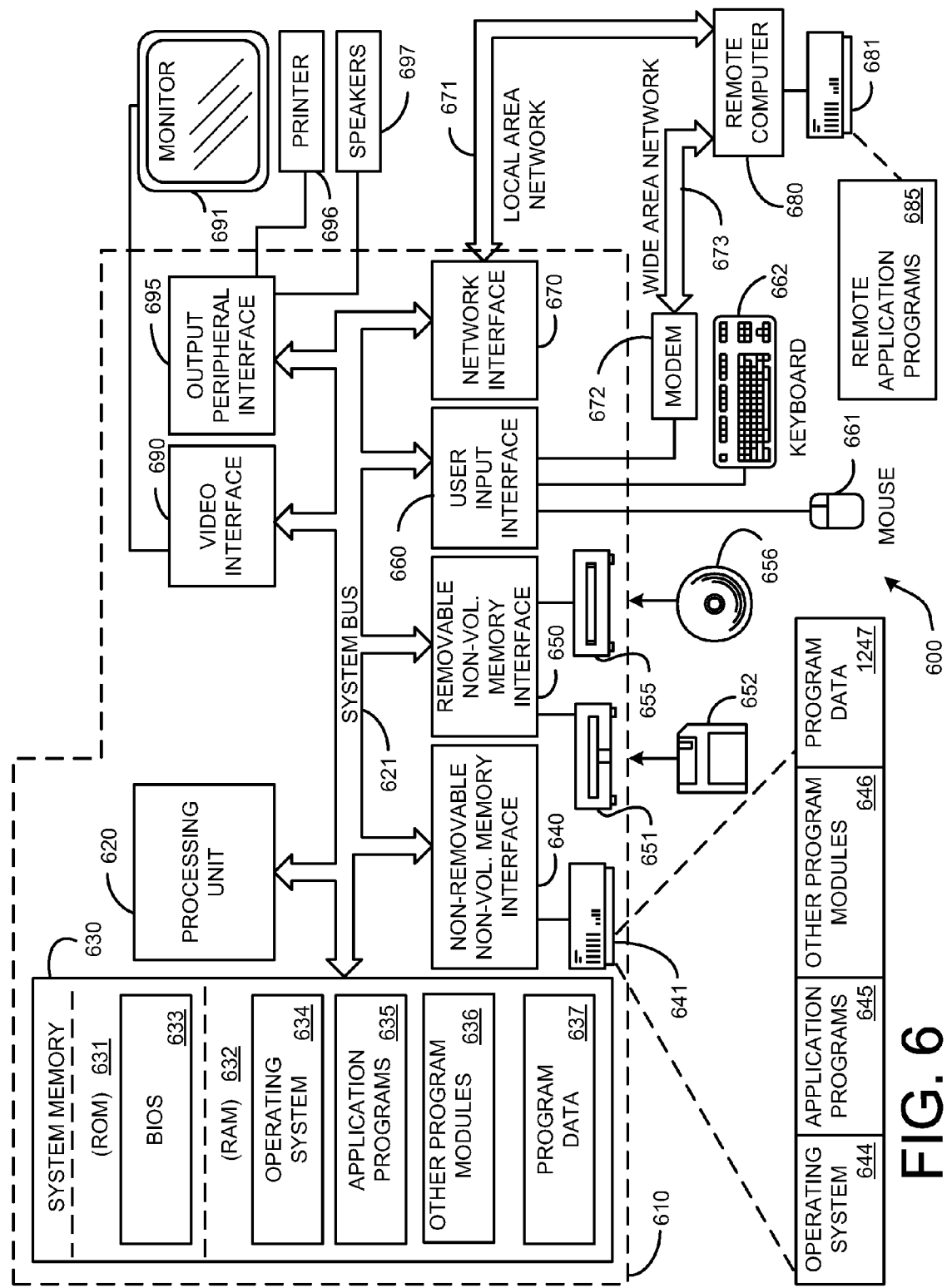
FIG. 6 illustrates an example of a suitable computing system environment in which embodiments of the streaming operator assignment system and method shown in FIGS. 1-5 may be implemented.

FIG. 6 illustrates an example of a suitable computing system environment in which the streaming operator assignment system 100 and method shown in FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment.

The full-text lattice indexing and searching system 100 and method is operational with numerous other general purpose or special purpose computing system environments or configurations. Examples of well known computing systems, environments, and/or configurations that may be suitable for use with the full-text lattice indexing and searching system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The streaming operator assignment system 100 and method may be described in the general context of computer-executable instructions, such as program modules, being executed by a computer. Generally, program modules include routines, programs, objects, components, data structures, etc., that perform particular tasks or implement particular abstract data types. The streaming operator assignment system 100 and method may also be practiced in distributed computing environments where tasks are performed by remote processing devices that are linked through a communications network. In a distributed computing environment, program modules may be located in both local and remote computer storage media including memory storage devices. With reference to FIG. 6, an exemplary system for the streaming operator assignment system 100 and method includes a general-purpose computing device in the form of a computer 610.

Components of the computer 610 may include, but are not limited to, a processing unit 620 (such as a central processing unit, CPU), a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer readable media. Computer readable media can be any available media that can be accessed by the computer 610 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 610. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 640 includes computer storage media in the form of volatile and/or nonvolatile memory such as read only memory (ROM) 631 and random access memory (RAM) 632. A basic input/output system 633 (BIOS), containing the basic routines that help to transfer information between elements within the computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information (or data) into the computer 610 through input devices such as a keyboard 662, pointing device 661, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 620 through a user input interface 660 that is coupled to the system bus 621, but may be connected by other interface and bus structures, such as, for example, a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for solving a load assignment optimization goal of a data processing system on a computer network having a plurality of nodes, comprising:
   determining a most overloaded node in the data processing system as measured by the optimization goal;
   determining a high-quality placement, with respect to the optimization goal, by iterating over all possible streaming operator placements for streaming operators on the most overloaded node as defined by the optimization goal;
assigning streaming operators to nodes based on the streaming operator placement to solve the optimization goal; and
processing data in real time as the data arrives at each of the plurality of nodes using the assigned streaming operators.

2. The computer-implemented method of claim 1, further comprising:
removing a streaming operator on the most overloaded node; and
placing the streaming operator on each of the other nodes in the system one at a time.

3. The computer-implemented method of claim 2, further comprising measuring how well each streaming operator placement achieves the optimization goal.

4. The computer-implemented method of claim 3, further comprising determining whether any of the streaming operator placements improve performance of the data processing system as measured by the optimization goal.

5. The computer-implemented method of claim 4, further comprising:
determining that at least one of the streaming operator placements improves performance of the data processing system as measured by the optimization goal; and
implementing a streaming operator placement that gives a greatest performance increase of the data processing system as measured by the optimization goal for operators being considered for placement.

6. The computer-implemented method of claim 4, further comprising:
determining that none of the streaming operator placements improve performance off the data processing system as measured by the optimization goal; and
selecting an operator on the most overloaded node in the data processing system having a next highest load as measured by the optimization goal.

7. The computer-implemented method of claim 4, further comprising repeating this process for an operator on the most overloaded node in the data processing system having a next highest load until either a new streaming operator assignment is found that give a better performance of the data processing system than a current streaming operator assignment or, if no such assignment can be found, then select a streaming operator assignment that gives a best performance.

8. The computer-implemented method of claim 1, further comprising defining the optimization goal as a maximum instantaneous overload of the data processing system based on a load sequence over an interval.

9. The computer-implemented method of claim 1, further comprising defining the optimization goal as an average instantaneous overload of the data processing system based on a history of the system.

10. The computer-implemented method of claim 1, further comprising defining the optimization goal as a maximum accumulated overload of the data processing system using a given load sequence over a time interval.

11. The computer-implemented method of claim 1, further comprising defining the optimization goal as an average accumulated overload of the data processing system using a given load sequence over a time interval.

12. A method for assigning streaming operators to nodes in a Computer network, comprising:
defining a plurality of optimization goals for distributed operator placement;
selecting one of the plurality of optimization goals to use as a measure for streaming operator placement optimization to obtain a selected optimization goal;
determining a most overloaded node in a data processing system as measured by the selected optimization goal; and
optimizing the selected optimization goal using the most overloaded node to obtain a optimized streaming operator placement; and
assigning the streaming operators to the nodes in conformance with the optimized streaming operator placement.

13. The method of claim 12, further comprising defining a maximum instantaneous overload of the data processing system bated on a history of the data processing system.

14. The method of claim 13, further defining the maximum instantaneous overload as a greatest relative difference between load on a node and the node's processing capacity for a given time interval, across each of the nodes and considering all load combinations that occur within the time interval.

15. The method of claim 12, further comprising defining a maximum accumulated overload of the data processing system using a given load sequence over a time interval.

16. The method of claim 15, further comprising defining the maximum accumulated overload as:

$$\max_{N_i \in N} \max_{t \in [t_0, t_1]} \frac{AccLoad(N_i, t)}{CPU_i},$$

where $N_i$ represents a node, N represents a set of all nodes in the system, $[t_0, t_1]$ is a time interval AccLoad($N_i$, t) is an accumulated overload of the node $N_i$ that occurs at a time t, and $CPU_i$ is a CPU capacity of the node $N_i$.

17. The method of claim 12, further comprising defining an average accumulated overload of the data processing system using a given load sequence over a time interval.

18. The method of claim 17, further comprising defining the average accumulated overload as:

$$\max_{N_i \in N} \frac{1}{t_1 - t_0 + 1} \sum_{t=t_0}^{t_1} \frac{AccLoad(N_i, t)}{CPU_i}$$

where $N_i$ represents a node, N represents a set of all nodes in the system, $t_0$ is a time that is less than $t_1$, $t_1-t_0+1$ is a length of a given sequence of load combinations, AccLoad($N_i$, t) is an accumulated overload of the node $N_i$ that occurs at a time t, and $CPU_i$ is a CPU capacity of the node $N_i$.

19. A method for using hill-climbing with random restart technique to minimize an optimization goal to solve a load assignment optimization problem in a data processing system having a plurality of nodes connected by a computer network, comprising:
defining a plurality of optimization goals for distributed operator placement;
selecting one of the plurality of optimization goals to optimize to obtain a selected optimization goal;
determining a most overloaded node in the data processing system as measured by the selected optimization goal;
removing a streaming operator on the most overloaded node and placing the removed streaming operator on each remaining node in the computer network one node at a time;

determining whether any of the streaming operator assignments improve performance of the data processing system based on the selected optimization goal;

if any streaming operator assignments does improve the performance, then implementing an optimal streaming operator assignment that gives the greatest performance improvement of the data processing system;

if none of the streaming operator assignments improves the performance, then selecting an operator on the most overloaded node in the data processing system having a next highest load as measured by the selected optimization goal; and repeating the above process until one of the following occurs; (a) a streaming operator assignment is found that achieves better performance than a current streaming operator assignment; (b) if no streaming operator assignment can be found that achieves better performance than a current streaming operator assignment, then select a streaming operator assignment that gives a best performance.

20. The method of claim 19, further comprising:

defining a maximum instantaneous overload of the data processing system based on a history of the data processing system;

defining an average instantaneous overload of the data processing system based on the history of the data processing system;

defining a maximum accumulated overload of the data processing system using a given load sequence over a time interval; and defining an average accumulated overload of the data processing system using the given load sequence over the time interval.

* * * * *

UNITED STATES PATENT AND TRADEMARK OFFICE
CERTIFICATE OF CORRECTION

| | | |
|---|---|---|
| PATENT NO. | : 8,060,614 B2 | |
| APPLICATION NO. | : 12/141914 | |
| DATED | : November 15, 2011 | |
| INVENTOR(S) | : Jonathan D. Goldstein et al. | |

It is certified that error appears in the above-identified patent and that said Letters Patent is hereby corrected as shown below:

In column 17, line 65, in Claim 12, delete "Computer" and insert -- computer --, therefor.

In column 18, line 15, in Claim 13, delete "bated" and insert -- based --, therefor.

Signed and Sealed this
Third Day of January, 2012

David J. Kappos
*Director of the United States Patent and Trademark Office*